Dec. 16, 1947.  T. P. CAMP  2,432,963
WATER-RESISTANT GYPSUM PRODUCTS AND PROCESS OF MAKING
Filed March 30, 1945
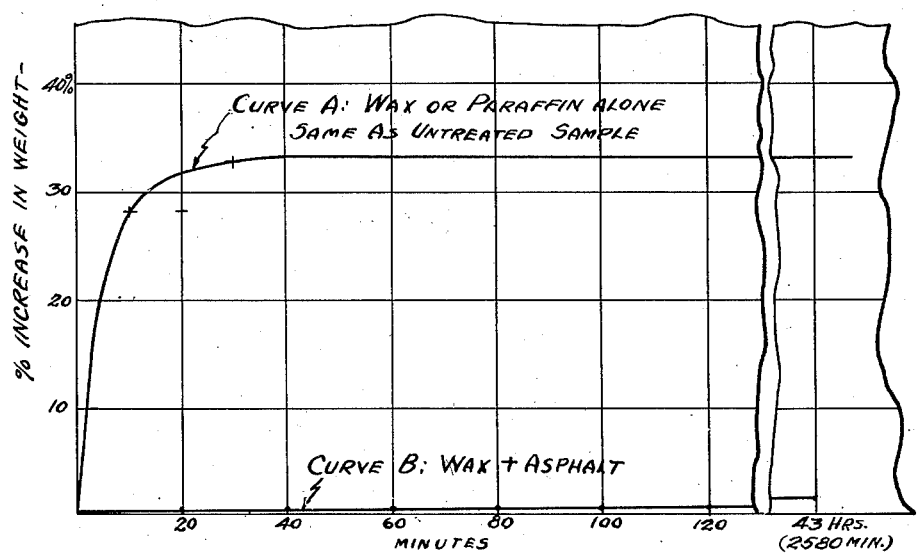
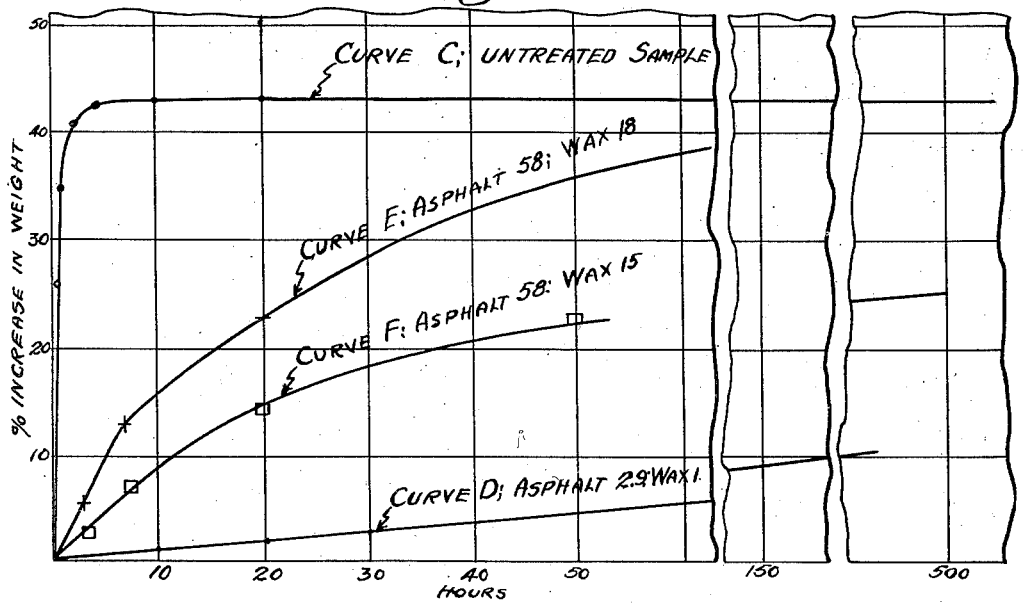

Patented Dec. 16, 1947

2,432,963

UNITED STATES PATENT OFFICE 2,432,963

WATER-RESISTANT GYPSUM PRODUCTS AND PROCESS OF MAKING

Thomas P. Camp, Arlington Heights, Ill., assignor to United States Gypsum Company, Chicago, Ill., a corporation of Illinois.

Application March 30, 1945, Serial No. 585,791

9 Claims. (Cl. 106—116)

This invention relates to means for producing water-resistant cementitious products. More particularly, the invention relates to the production of highly water-resistant gypsum wallboard.

Regular gypsum wallboard and similar products have very little resistance to water. When ordinary gypsum wallboard is immersed in room temperature water, for example, 70° F., the lack of water resistance is readily demonstrated by the fact that in a short time the gypsum core has absorbed a considerable amount of water. Actual tests have demonstrated that when a 2" x 4" cylinder of gypsum board core material was immersed in water at about 70° F., the material showed a water absorption of 36% after having been immersed for 40 minutes. Many attempts have been made in the past to improve the water resistance of gypsum products. These attempts included the incorporation of water-resistant material such as metallic soaps, asphalts, waxes, resins, etc., within the wet calcium sulfate mixture. They also included attempts to coat the finished gypsum board with water-resistant films or coatings.

One example of past attempts to waterproof this material integrally by the addition of water-repellent substances is that disclosed in the King and Camp United States Patent No. 2,198,776. This shows the incorporation of paraffin wax, asphalt, or other fusible water-insoluble organic substances into a gypsum mix by first melting this waxy material and then dispersing such material into the wet gypsum mix by spraying the hot molten mass into the aqueous gypsum dispersion. This brings about a formation of finely dispersed solidified paraffin or asphalt particles which then serve to improve the water resistance of the gypsum product. While these past efforts resulted in some degree of success, there has been no waterproofing process developed in the past which was capable of causing a drastic increase in water-resistance by the use of only a comparatively very small amount of cheap water-proofing materials.

The object of my invention is to produce highly water-resistant gypsum wallboard.

Another object of my invention is to produce highly water-resistant light weight gypsum wallboard.

Still another object of my invention is to produce optimum water resistance with a minimum of waterproofing materials.

The present invention is illustrated by a number of graphs which will be more fully described later.

Gypsum wallboard is made by depositing a plastic gypsum mass between fibrous liners, pressing the mass to a desired thickness by means of rollers, and allowing the gypsum to set and harden before cutting the formed gypsum board, and finally passing the formed gypsum board through a drier to remove excess moisture. Light weight gypsum board is the product obtained by incorporating an aerated foam with the gypsum, thereby causing the production of air spaces in the gypsum mass, with resultant lightening of the finished gypsum board.

I have discovered that if a mixture of paraffin wax and asphalt, in definite proportions, say on the order of from about 5% to about 15% (dry basis), is incorporated in the form of an emulsion with a wet plastic gypsum mass, the finished dried gypsum wallboard will possess a degree of water resistance which is greatly out of proportion to the degree of water resistance obtained if one uses these same paraffin wax and asphalt materials without emulsification. The degree of water resistance obtained by the use of a mixture of paraffin wax and asphalt in certain proportions is very much greater than that obtained when one uses either the wax alone or the asphalt alone in emulsified form.

I have also discovered that combinations of wax with asphalt produce unusually high water resistance, but that this desired water resistance is obtained only if the wax and asphalt are kept within certain relative and critical proportions.

Fig. 1 shows the relationship between water resistance as measured by the per cent increase in weight caused by the immersion of a gypsum product in water at 70° F. plotted against the immersion time. The sample tested was a 2" x 4" gypsum cylinder taken from a light-weight gypsum board core composition having a weight of 65 pounds per cubic foot. Referring to this figure, curve A shows that after an immersion of 40 minutes the nontreated gypsum core sample had absorbed 36% of water. A similar sample, in the making of which 3.2% of asphalt in the form of an emulsion had been used, absorbed 28% of water after being immersed even as little as 20 minutes. Another sample, treated with 1% of paraffin wax in the form of an emulsion, absorbed 15% of water after 20 minutes. It will be noted that all three samples give results falling on the same curve A. When, however, the sample was that of a core material treated with an emulsion mixture containing both asphalt and paraffin wax, in the ratio of 3.2 parts of asphalt to 1 part of paraffin wax, the degree of water resistance was very drastically increased as shown by curve B, which shows that very little water was being absorbed, and that even after 43 hours' immersion, the amount of water absorption was only about 2.5%. This is a remarkable, entirely unpredictable, and most unexpected result, as one would normally take it for granted that the two substances, both having water-repellent properties, would be expected to act merely cumulatively.

Fig. 2 demonstrates the effect of varying the ratio of wax to asphalt in the wax-asphalt emulsion. These tests were made with a 7" x 7" sample of ⅜" thick gypsum board of the type weighing 1550 pounds per thousand square feet. The tests were carried out at 70° F. Curve C, in Fig. 2, plots the results obtained with the nontreated control sample, which absorbed 26% of water after an immersion period of only 15 minutes, and which attains a maximum absorption of about 48% after about 10 hours after the original immersion. In contrast to this, curve D shows the remarkable influence on the water-resistance produced by the use of an emulsion which contains an asphalt to wax ratio of 2.9:1, namely, 58 parts of asphalt and 20 parts of paraffin wax (both figures being on the anhydrous, dry-substance basis). The amount of water-proofing used on the gypsum board was in the ratio of 78 pounds of asphalt-wax dry substance per thousand square feet of ⅜" board, introduced in the form of an emulsion. Curve D illustrates the striking increase in water resistance by the fact that a water absorption of 26% was reached by the control sample in 15 minutes, whereas the asphalt-wax emulsion, containing these two ingredients in ratio of 2.9:1 produced a wallboard which did not attain the same 26% water absorption until it had been immersed in the 70° F. water for a period of 500 hours. This is a striking increase in water resistance considering the small amount of waterproofing material which has been used. Thus the treatment resulted in a gypsum board product whose water resistance is 2000 times as great as that of the nontreated gypsum board. This result is all the more remarkable and unexpected when one takes into consideration the fact that when either asphalt or wax was used alone in emulsion form the amount of increase in water resistance was only slightly above that of the nontreated gypsum product. It is evident that the combined use of asphalt and wax in emulsified form produces a phenomenal increase in the water resistance of gypsum. The effect of varying the ratio of asphalt to wax in the emulsion is shown in curves E and F of Fig. 2. Curve E shows the effect of a ratio of 58 parts of asphalt to 18 parts of wax. Curve F shows the effect of a mix of 58 parts of asphalt and 15 parts of wax. While these other ratios of asphalt to wax did not produce as great a water resistance as that shown in curve D, nevertheless the degree of increased water resistance with these other asphalt-wax ratios is still a drastic improvement over that obtained with nontreated gypsum, or with the use of either wax or asphalt separately.

*Example*

A plastic gypsum mass or slurry containing 1000 pounds of calcined gypsum is mixed with 100 parts of an emulsion containing 50 pounds of asphalt (dry substance) and 10 pounds of paraffin wax (dry substance). The asphalt-wax emulsion is produced by dispersing these two water-resistant materials by means of a protein dispersing agent. However, a suitable wax emulsion and a suitable asphalt emulsion may be prepared separately, and proper amounts of each added to the calcined gypsum slurry. The emulsion is added to the slurry in any convenient manner. In the case of light-weight gypsum board, the emulsion may be fed to the foam inlet which discharges the foam that is added to the gypsum slurry to produce a light-weight aerated gypsum product. The foam containing the asphalt-wax emulsion is then incorporated with the gypsum in the usual way, and the resulting mix dried at such a temperature that the mass attains a temperature of about 200° F. Both the asphalt and the wax should have a melting point below the drying temperature. It is necessary to melt the asphalt-wax mixture during the drying operation in order to obtain effective waterproofing. In view of this, it is necessary to use asphalt material whose ring-and-ball softening point is not above about 185° F., and to use a wax material having a melting point not above 165° F. An asphaltic product, derived from petroleum residues, and having a ring-and-ball softening point of about 110° F. is preferred.

Gypsum board produced in accordance with the above example and containing the specified ratio of asphalt to paraffin wax produced a finished board product having high water resistance. The amount of asphalt-wax mixture used should be about 5%, based on a dry substance ratio of gypsum board to asphalt-wax material. A workable range is between 5% and 15%. The ratio of asphalt to wax may vary between 1:1 and 10:1. The reason why the combination of asphalt with wax brings about such a striking increase in water resistance is not clearly understood. It is believed, however, that the asphalt seems to act as a vehicle for causing the deposit of wax particles upon the gypsum crystals in a form that is conducive towards water repellency.

While the following explanation is purely theoretical, it is offered as a plausible explanation of the otherwise anomalous results obtained. Asphalts, particularly those of petroleum origin, are, when cold, very poor solvents for paraffin waxes. The waxes, when molten, are however miscible with the molten asphalts. When such a mixture cools, however, the wax will separate out. When used in the proportions herein set forth, the wax will separate in the form of extremely minute particles which at the surface of the cooled mixture may slightly protrude, producing an effect like that of a nasturtium leaf, on which, as is well known, water drops will run about like drops of mercury without wetting the leaf. This would produce the effect of having the water assume a negative meniscus relative to the coated gypsum crystals, and may therefore account for the immensely lowered water absorption. This explanation is also in accord with a further observation, namely, that if the water-absorption test is made at a temperature at or above the softening point of the wax-asphalt mixture, the water absorption suddenly greatly increases. It is known that both asphaltic substances and wax are at least wettable by water, and while they may prevent access of water to the coated crystals, will not necessarily produce the phenomenon of a negative meniscus. On the assumption of microscopic protruding wax crystals or particles, the effect however can at least be explained. The explanation also fits in well with the observed effect that mixtures outside of the preferred range do not produce the desired results. Some persuasive evidence of the probable correctness of this theory was obtained by making the following test:

A sheet of plate glass was coated with strips of coating compositions having, in the order named, the following composition: (1) pure roll-saturant asphalt having a softening point of 115° F.; (2) 1 part of paraffin wax melting at 122-124° F. plus 1 part of the asphalt; (3) 2 parts of asphalt to 1 of the wax; (4) 4 parts of asphalt to 1 of the wax; (5) 8 parts of asphalt to 1 of wax; (6) the wax alone. Two-inch strips of these compositions having been applied to separate areas of the plate glass, the plate was placed in an oven at 250° F. to 300° F. for 10 minutes to remelt the materials and to simulate the conditions which would be encountered during the heating of gypsum or other cementitious compositions containing particles coated with such compositions, and also to let the coating come to a smooth even surface. The plate was then cooled. When thoroughly cool, the plate with its coating was placed under a stream of running cold tap water for 24 hours. When removed from the stream of water, it was found that the water on those strips which contained both wax and asphalt had immediately run off, or collected in small drops having a negative meniscus to the coating. The strip of plain asphalt was completely wetted and remained wet over its entire area. The strip of plain paraffin wax had almost entirely vanished having been practically washed from the glass by the fact that its adherence thereto was so slight that the water was able to penetrate between the wax and the glass and therefore loosened it therefrom, thereby flushing off the wax. An examination of the surfaces of the strips containing the wax showed definitely the presence of a surface film of paraffin, varying in thickness, depending upon the relative ratio of the wax to the asphalt. This would indicate that the asphalt in the composition insures the adherence of the mixture to the surfaces coated thereby while the oriented surface particles of paraffin wax produced the negative meniscus; but the wax is kept from washing away by partially being embedded in the asphalt.

Regardless of whether or not the above theory is correct, experimental facts have demonstrated that a particular and critical combination or ratio of asphalt and paraffin wax will produce these unusual improvements in water resistance.

Further proof as to the remarkable and unexpected results is illustrated in the table given below:

*21 hour water absorption*

[7" square ⅛" 1500 lbs. per M sq. ft. gypsum board paper-sealed, edges open]

% Water Absorbed

| % Paraffin Wax | | | | | | | |
|---|---|---|---|---|---|---|---|
| 2.28 | 75 | | | 24 | 6 | | |
| 1.42 | | | | 17 | | | |
| 1.00 | 75 | | 40 | 38 | 4 | 2 | 3 |
| .500 | | 65 | 33 | | 33 | 23 | |
| 0 | 71 | | 72 | | 71 | 65 | |
| | 0 | 1.24 | 1.65 | 2.48 | 4.14 | 8.28 | 9.99 |

% Asphalt

In the above table, the asphalt (dry basis) is plotted against the paraffin wax (also dry basis) and the figures in the body of the table, as indicated by the heading "% Water Absorbed," are in terms of percent of water absorbed by the sample upon 21 hours' immersion. It should be particularly noticed that as much as 2.28% of paraffin wax when used alone still failed to properly waterproof the material, as it showed a 75% water absorption; which is approximately the same as a sample containing no wax at all. As to the asphalt, even 8.28% thereof, when used alone, brought down the water-absorption only by 6% (i. e. to 65%). Notice, however, the astounding effects of the conjoint use of wax and asphalt. Even when as little as 1.0% of wax and 4.14% of asphalt was conjointly used, the water absorption dropped to 4%. I have marked off the upper right hand corner of my table with dash lines in order to draw attention to the highly effective area of the table. The effective range of ratios of paraffin wax to asphalt lies somewhere between 1.0 of wax to from about 1 to 10 of the asphaltic material. While natural asphalts are satisfactory, I find that the petroleum residue type of asphalt gives desirable results.

While the preferred method of this invention involves the use of a ready-made asphalt-wax emulsion which has been dispersed by a protein material, the present invention is not limited to this type of emulsion. One may use other emulsifying materials in place of protein. For example, one may use soaps, clay or bentonite, various wetting agents such as the sulfated or sulfonated fatty alcohols and fatty acids, various amine soaps, and various starch and dextrin material. For example, one may purchase a ready-made asphalt emulsion and mix this with a separately procured paraffin wax emulsion, or a wax emulsion prepared by dispersing paraffin into a starch paste, or one may produce the desired asphalt-wax emulsion by mechanical means.

Emulsions of either wax or asphalt can readily be prepared by pouring the materials in the melted condition into a violently agitated mass of water which contains a protein dissolved therein. Many methods of preparing emulsions in this manner are described in the literature; for instance, in W. Clayton's "Emulsions and emulsification"; and Harry B. Weiser's "Colloid chemistry."

Regardless of how the emulsion is produced, the important factors are the use of an emulsion or emulsion mixtures containing the proper ratio of asphalt and wax, and also having the ability of blending in such a manner as to bring about, after the subsequent breaking of the emulsion in the gypsum mix, a deposit of asphalt containing paraffin wax particles in a form in which the inter-surface tensions are such as to produce the greatly increased water resistance herein described.

While the invention has been described in connection with gypsum boards, it will be evident that it may be used with other gypsum products, such as roof-deck slabs, partition tile, gypsum lumber and the like. The emulsion or emulsions are merely mixed with the desired type of gypsum slurry, the slurry cast into form, and after the gypsum has set the casts are dried under conditions where the mass, after elimination of most of the moisture therefrom, attains a temperature sufficiently high (say about 200-225° F.) to permit of the formation of the wax-asphalt mixture coating on the gypsum particles; and where, after cooling, the nonwetting and water-resistant effect becomes manifest.

Under some conditions it is possible to use waterproofing materials having somewhat higher melting points; as for instance a hard paraffin wax and an asphaltic material having a ring-and-ball softening point as high as 185° F. With such materials, however, the temperature to which the dried castings are exposed must be raised at least to the point where both the asphaltic material and the paraffin wax, or the mixture thereof, is sufficiently liquefied to permit of its spreading over the particles or crystals of the gypsum. Upon cooling, and when the proportions herein indicated have been adhered to, the desired water-resistant result will be attained.

The production of suitable emulsions is well understood and many forms of emulsion are obtainable upon the market, hence the present invention is not to be limited to the particular manner either in which the emulsion is prepared or how it is incorporated with the slurry from which either the gypsum board or the tile, etc., are formed. The instrumentalities for the production of gypsum board are well known and hence need no further description here.

Moreover, full instructions on the mechanical features of gypsum board construction can be found in the following United States patents: Utzman 1,330,413; Pfeffer 1,758,200; Gough et al. 1,767,791; Birdsey 1,870,439; Gough 1,915,603; Roos 2,017,022; 2,044,401; 2,079,338; 2,080,009; and Camp 2,207,339.

It might be stated, for the sake of completeness, that the products of the present invention are eminently suitable for marine uses, and have gone into very widespread use in the form of so-called "marine board," which is a paper-covered gypsum-core board having an outer liner of metal laminated thereto. This board is used for bulkheads, cabin linings and ceilings, etc.

Accordingly applicant claims:

1. A water-resistant gypsum composition comprising a set mass of interlaced gypsum crystals that are coated with a petroleum base asphalt containing dispersed therein minute paraffin wax particles rendering the coating substantially non-wettable by water, the total amount of said asphalt and wax in the composition not exceeding about 15% by weight thereof, and the ratio of asphalt to wax being within the range of from about 2 to about 10 parts of asphalt to each part of wax.

2. A water-resistant gypsum product containing, in the form of a coating adhering to the gypsum crystals thereof, from about 5% to about 15% by weight of a composition comprising a petroleum base asphalt having dispersed therein minute paraffin wax particles rendering the coating substantially non-wettable by water, the ratio of asphalt to wax being within the range of from about 2 to about 10 parts of asphalt to each part of wax.

3. A water-resistant gypsum product containing, in the form of a coating adhering to the gypsum crystals thereof, about 5% by weight of a composition comprising a petroleum base asphalt having dispersed therein minute paraffin wax particles rendering the coating substantially non-wettable by water, the ratio of asphalt to wax being about 4:1.

4. Water-resistant gypsum board, the gypsum crystals of the core composition of which are coated with not exceeding about 15% by weight of a continuous film of a petroleum base asphaltic material containing therein imbedded individual closely adjacent microscopic paraffin wax particles, the ratio of asphalt to paraffin wax being within the range of from about 2 to 10 parts of asphalt to each part of wax.

5. Process of producing a water-resistant gypsum product which comprises admixing with an aqueous calcium sulfate hemihydrate slurry an emulsion containing paraffin wax and a petroleum base asphalt in the relative proportion of one part of wax to from about 2 to about 10 parts of asphalt (both on the dry basis), casting the resulting mixture into shape, and subjecting the resulting set shape to drying conditions at a temperature sufficiently high to permit the product to attain a temperature of at least about 150° F., whereby to cause the wax and asphalt to interfuse, and, upon cooling, to become deposited upon the gypsum crystals in the product in the form of a coating consisting of a continuous asphalt phase containing therein dispersed minute paraffin wax particles rendering the coating substantially non-wettable by water.

6. Process of producing a water-resistant gypsum product which comprises admixing with an aqueous calcined gypsum slurry both paraffin wax and a petroleum base asphaltic material in the relative ratio of about 1 part of said wax to from about 2 parts to about 10 parts of said asphaltic material, introduced into the slurry in the form of an aqueous emulsion, casting the resulting mixture into shape, and after the slurry has set into a solid, heating the latter to a temperature of about 150° F. until it is dry, whereby to cause the wax and asphalt to interfuse, and, upon cooling, to become deposited upon the gypsum crystals in the product in the form of a coating consisting of a continuous asphalt phase containing therein dispersed minute paraffin wax particles rendering the coating substantially non-wettable by water.

7. Process of producing a water-resistant gypsum board which comprises mixing with a gypsum board core slurry in the form of an emulsion an amount of paraffin wax and a petroleum base asphalt in the relative proportion of from about 1 part of paraffin wax to from about 2 to 10 parts of asphalt to yield in the core an amount of said mixture of from about 5% to about 15% (dry substance basis on weight of dry board); forming the board, and drying it under conditions permitting the attainment of a temperature of at least 150° F., so as to fuse the mixture of wax and asphalt and cause it to become distributed over the gypsum crystals in the mass, and thereafter upon cooling to form a coating relatively non-wettable by water, containing minute paraffin wax particles in a matrix of asphalt.

8. Process of producing a water-resistant gypsum article which comprises incorporating with a calcined gypsum slurry an emulsion containing dispersed petroleum base asphalt and paraffin wax, heating the resulting set product to a temperature sufficient to deposit a film of molten solution of said wax in said asphalt upon the gypsum crystals therein and cooling the article to solidify the molten solution and cause the wax therein to separate out of the asphalt solution and protrude individually from the general surface of the asphaltic material.

9. Method of depositing paraffin wax particles on calcium sulfate crystals of a gypsum composition in a form in which the intersurface tensions are conducive toward the production of greatly increased water-resistance and greatly decreased water-absorption which comprises the steps of coating the crystals with a composition comprising paraffin wax dissolved in a molten petroleum base asphaltic material having a low solvent power for paraffin wax when cold, and thereafter cooling the material containing the dissolved wax to effect the precipitation of individual paraffin wax particles upon the surface of the asphaltic layer surrounding the crystals.

THOMAS P. CAMP.

REFERENCES CITED

The following references are of record in the file of this patent:

UNITED STATES PATENTS

| Number | Name | Date |
|---|---|---|
| 2,198,776 | King | Apr. 30, 1940 |
| 2,291,905 | Koenig | Aug. 4, 1942 |